J. D. YODER.
WATER TREATING PROCESS AND APPARATUS.
APPLICATION FILED MAY 8, 1920.
Patented Jan. 3, 1922.
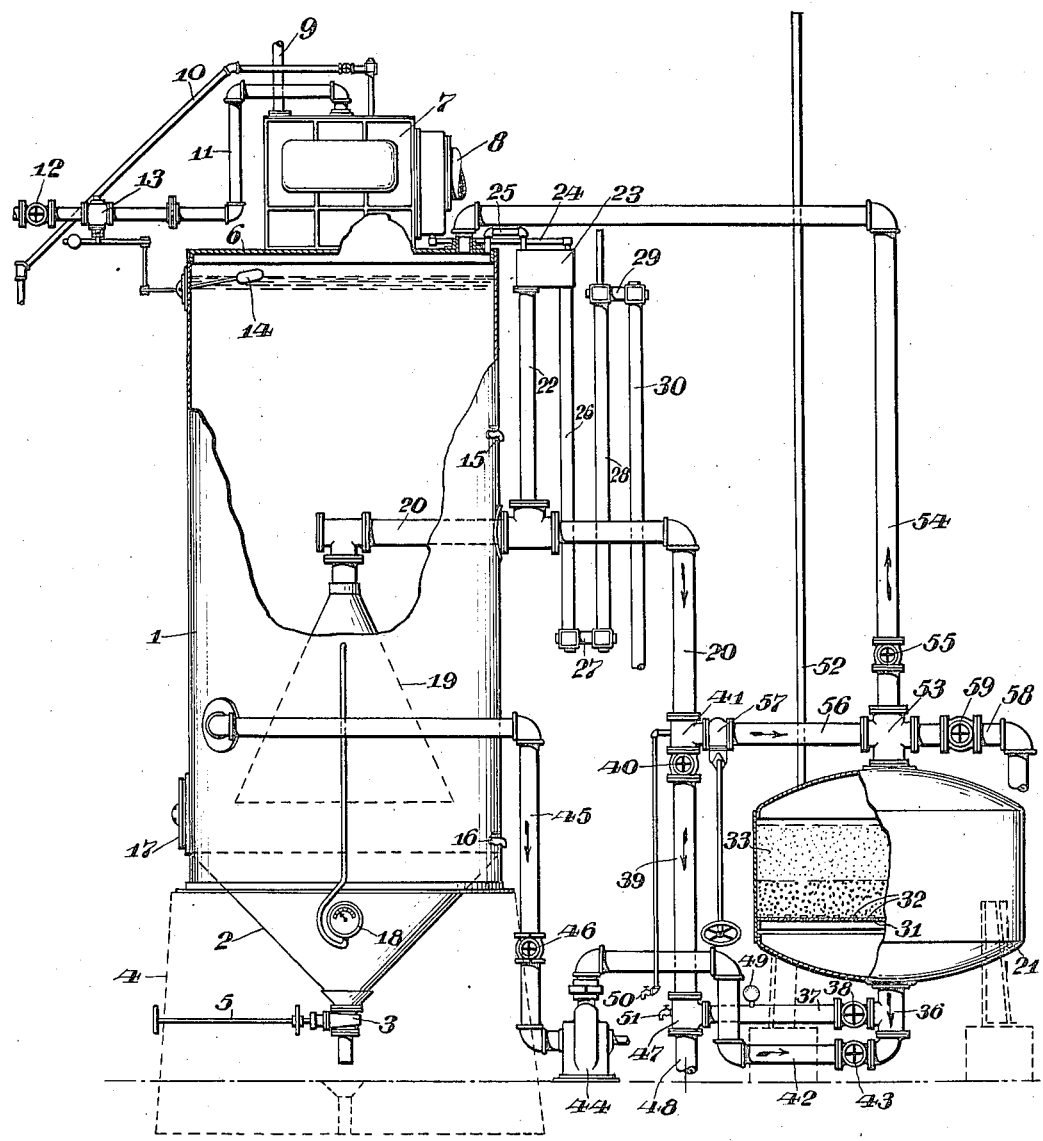
INVENTOR.
Joseph D. Yoder
BY Cornelius L. Ehret
his ATTORNEY.

UNITED STATES PATENT OFFICE.

JOSEPH D. YODER, OF PHILADELPHIA, PENNSYLVANIA, ASSIGNOR TO H. S. B. W.-COCHRANE CORPORATION, OF PHILADELPHIA, PENNSYLVANIA, A CORPORATION OF PENNSYLVANIA.

WATER-TREATING PROCESS AND APPARATUS. REISSUED

1,402,277.   Specification of Letters Patent.   Patented Jan. 3, 1922.

Application filed May 8, 1920. Serial No. 379,700.

*To all whom it may concern:*

Be it known that I, JOSEPH D. YODER, a citizen of the United States, residing in the city and county of Philadelphia, State of Pennyslvania, have invented certain new and useful Improvements in Water-Treating Processes and Apparatus, of which the following is a specification.

My invention relates to water treating apparatus and process, and more particularly to apparatus and process for softening and filtering water to be used in steam boilers.

My invention resides in water treating apparatus of the character referred to comprising a sedimentation or treating tank, means for feeding water and softening reagent or a mixture of the two to the sedimentation tank, a filter, piping connections for conveying softened and settled water to the filter for filtration therethrough, and piping connections for conveying water from the sedimentation tank for washing the filter.

My invention resides further in apparatus of the character referred to comprising a novel arrangement of the filter wash water piping connections, whereby water for washing the filter may be withdrawn from the sedimentation tank, while softened and settled water for supplying a steam boiler is also withdrawn therefrom at the usual rate, without disturbing the normal effective operation of the sedimentation tank.

My invention resides further in apparatus of the character referred to wherein the water employed for washing the filter may be returned to the treating tank.

My invention resides further in a process for treating water wherein water for washing a filter is withdrawn from the treating tank without affecting the normal effective operation of the treating tank.

My invention resides further in a process of treating water wherein water withdrawn from a treating tank after use for washing a filter is returned to the treating tank.

My invention resides further in the apparatus and process hereinafter described.

For an illustration of one form which my invention may take, reference is to be had to the accompanying drawing, in which the figure is a front elevation with parts in section.

Referring to the drawing, 1 is a treating tank of any desired size and shape, and is preferably a vertically disposed cylindrical tank of greater length than is the diameter. The tank 1 is provided with a bottom 2. preferably conical in form, having at its lower end or vertex, a valve 3 for the withdrawal of sludge and sediment. Tank 1 rests upon a foundation 4. Valve 3 is provided with operating rod 5, which extends beyond the wall of foundation 4.

On the top of tank 1 is a cover 6, carrying the water heater 7. Heater 7 is shown as an open type heater operating with exhaust steam supplied through exhaust steam pipe 8, but any type of heater other than the form shown may be employed, and the heater may be omitted, or may be separate from the treating tank.

Leaving the top of the heater 7 is a vent pipe 9, and entering the heater are the softening reagent supply pipe 10 and raw water supply pipe 11. Reagent supply pipe 10 receives softening reagent in correct measured quantity from any suitable supply means (not shown). Raw water supply pipe 11 is controlled by hand valve 12 and automatic valve 13, the latter operated by float 14 in the top of the tank 1 and connected therewith by means of levers in well known manner, so that as the level of water in tank 1 rises and falls, valve 13 is closed and opened, respectively, whereby a substantially constant water level is maintained in tank 1.

Tank 1 is provided with water test cock 15 adjacent the upper end thereof, sludge test cock 16 adjacent the lower end thereof, a manhole 17, and an extension thermometer 18 connected with the tank at any desired point, as for example, in the middle portion of the tank. Within tank 1 is the up-take chamber 19, here illustrated as conical and having its open or larger end spaced a short distance from the bottom of tank 1. I prefer a conical up-take chamber, but it is to be understood that my invention is not limited thereto, as other forms of up-take chamber, such as a cylindrical or tubular chamber extending from the top to adjacent the bottom of tank 1, or a cylindrical chamber open at the bottom and closed at the top may be employed.

Leading from the upper end or vertex of the up-take chamber 19 is a pipe 20 extending laterally through the wall of tank 1 and connecting with filter 21, as hereinafter described. Extending vertically from pipe 20, pipe 22 connects with overflow box 23, which communicates through pipes 24 and 25 with the top of tank 1 and to the heater 7, respectively. The pipe 24 serves to convey oil from the oil separating chamber of heater 7 to the overflow chamber, while pipe 25 serves to equalize the pressure between tank 1 and the overflow chamber. The overflow chamber discharges to waste through the water seal formed by pipes 26, 27, 28, 29 and 30.

Spaced from the bottom of filter 21 is a diaphragm 31 provided with strainer valves 32 and carrying the filter bed 33, of gravel and sand. The bottom of filter 21 below diaphagm 31 communicates through T 36 and pipe 37, controlled by valve 38, with pipe 39, controlled by valve 40; pipe 39 connecting through T 41 with pipe 20. The bottom of filter 21 also communicates through T 36 with pipe 42, controlled by valve 43, connected to the pressure side of pump 44; the intake of pump 44 connecting through pipe 45, controlled by valve 46, with the inside of tank 1. The pipe 45 enters tank 1 at a point above the lower end of up-take chamber 19 and below the top of tank 1, as and for the purpose hereinafter described.

Pipes 37 and 39 connect through T 47 with pipe 48, which leads to the boiler feed pump or other means to be supplied with softened or softened and filtered water (not shown). The pipe 37 is provided with a pressure gauge 49, and T's 41 and 47 are provided with test cocks 50 and 51, respectively.

The upper end of filter 21 above the filter bed 33 is provided with an air vent pipe 52 and connects through the cross connection 53 and pipe 54, controlled by valve 55, with the top of tank 1. Cross connection 53 also connects through pipe 56, controlled by valve 57, with T 41, and through pipe 58, controlled by valve 59, to waste.

Pipes 54 and 45 are preferably connected to treating tank 1 at opposite sides thereof, so that the greatest possible quantity of water may be withdrawn from tank 1 through pipe 45 before wash water returned to tank 1 by pipe 45 reaches the intake of pipe 45. This arrangement is, however, not essential, and pipes 54 and 45 may join tank 1 in any desired relation to each other around the circumference thereof.

The operation is as follows:

Raw water and softening reagent are supplied through pipes 10 and 11 to the heater 7, where they mix and are heated by exhaust steam supplied to the heater through pipe 8. The hot mixture of water and softening reagent fall into the top of tank 1 and flow downwardly therein. During the progress of the water and softening reagent downwardly in tank 1, the water is softened and a precipitate produced which tends to settle to the bottom of tank 1. The softened water carrying precipitate and suspended solid matter flows under the lower edge of up-take chamber 19 and upwardly therein through pipes 20 and 56 into the top of filter 21, through filter bed 33, and discharges through T 36 and pipes 37 and 48. During the passage of the water downwardly in tank 1, under the edge of chamber 19 and upwardly therein, the greater portion of the suspended solid matter therein settles downwardly and falls to the bottom of tank 1, from which it is withdrawn periodically through valve 3. This separation of solid matter occurs principally near the lower edge of chamber 19. The size of the apparatus is proportioned to the amount of water to be treated to produce the desired rate of flow in tank 1 and chamber 19 and the resulting desired degree of sedimentation therein.

For washing filter 21, valves 57 and 38 are closed and valve 40 opened, whereby softened and settled water passes directly from chamber 19 to the point of supply. This water, by-passed around filter 21, will contain some solid matter not settled out in tank 1, and if desired, may be passed through another filter. While valves 57 and 38 are closed, valves 46 and 43 are opened and pump 44 is operated to draw water from tank 1 and force it upwardly through filter bed 33 and wash the same. The wash water, after passing through filter bed 33, may be delivered through pipe 54 back into the top of tank 1, or it may be delivered through pipe 58 to waste. The wash water, after passing through filter bed 33, will carry comparatively large quantities of suspended solid matter, and if expedient, this water may be wasted as stated. However, I prefer to deliver it into the top of tank 1 wherein most of the suspended solid matter separates by sedimentation as above described, and the softened water is saved.

In washing the filter as above described, softened water is withdrawn from tank 1, passed through the filter, and returned to the top of tank 1. The water so returned to the top of tank 1 contains a large quantity of suspended solid matter washed from the filter bed. If pipe 45 were connected to tank 1 near the working water level, the water containing large amounts of suspended solid matter returned to tank 1 from filter 21 would be returned to the filter and continue to circulate between filter 21 and tank 1 during the washing operation; and the cleansing of the filter would not be efficient. Pipe 45 is therefore connected to tank 1 at a sufficient distance below the working water level therein that the wash water returned to tank 1 from filter 21 will not reach the intake of pipe 45 until after the washing operation is complete. In this way clean water containing only the normal quantity of suspended solid matter is supplied to the filter for washing purposes.

As pointed out above, a large proportion of the suspended solids separate from the water by sedimentation in tank 1. The efficiency of the sedimentation depends upon the rate of flow of water downwardly in tank 1, under the edge of chamber 19 and upwardly in the chamber, and principally upon the rate of flow around the edge of the chamber, and for continuous and efficient operation this rate of flow around the edge of the chamber must not be increased materially. The pipe 45 is therefore connected to tank 1 at a substantial distance above the lower edge of chamber 19, where the rapid withdrawal of water for washing the filter will not affect the rate of flow under the edge of chamber 19. The rate of flow of water downwardly in tank 1 from the top thereof to the point of connection of pipe 45 is increased by withdrawal of water through pipe 45 for washing purposes; but this part of tank 1 is not primarily effective for removing suspended solids from the water, and the effective sedimentation of solids from the water is not materially interfered with by the withdrawal of water through pipe 45 positioned with relation to the lower edge of chamber 19 as stated.

By the above arrangement, water of substantially uniform suspended solid content is delivered from chamber 19 through pipe 20, and the uniformity of the water so delivered is not affected during the washing of the filter.

What I claim is:

1. Water treating apparatus comprising a treating chamber, means for supplying water to one end of said treating chamber, an up-take chamber within said treating chamber and forming a part thereof, a filter, means for withdrawing water from said up-take chamber and passing said water through said filter, a connection with said treating chamber intermediate the ends thereof and independent of said last named means for supplying wash water to said filter, and a connection for conducting the wash water back to said chamber.

2. Water treating apparatus comprising a treating tank, means for supplying water to the top of said treating tank, an up-take chamber within said treating tank having an open end adjacent but spaced from the bottom of said treating tank, a filter, a pipe connecting a section of said up-take chamber remote from said open end with one side of said filter, and a pipe connecting a section of said treating tank remote from said open end of said up-take chamber and outside thereof with the opposite side of said filter.

3. Water treating apparatus comprising a treating tank, an up-take chamber within and forming a part of said treating tank, a filter, means for conveying water from the upper end of said up-take chamber through said filter in one direction, means for conveying water from said treating tank through said filter in opposite directions, and means for conveying said last named water from said filter to said treating tank.

4. Boiler feed water treating apparatus comprising a treating tank, a filter, means for passing wash water from said treating tank in reverse direction through said filter, and means for returning said wash water after passage through said filter to said treating tank.

5. The process of treating water, which consists in continuously supplying water mixed with softening reagent, passing a portion of said water through a filter, washing the filter with a portion of said water, and returning the wash water to the supply of unfiltered water.

6. Water treating apparatus comprising a treating tank, means for supplying water into the top of said treating tank, an up-take chamber within said treating tank and communicating with the lower end thereof, a filter, a conduit connecting said up-take chamber with said filter, means for removing filtered water from said filter, a conduit communicating with said treating tank intermediate the working water level and the intake end of said up-take chamber for supplying wash water to said filter, and a conduit for returning said wash water to said treating tank.

7. The process of treating water, which consists in passing a stream of water downwardly through a treating tank and upwardly in an up-take chamber, withdrawing water from said up-take chamber and passing it through a filter, withdrawing water from said stream before it reaches said up-take chamber, and washing said filter therewith.

8. The process of treating water, which consists in flowing a stream of water and softening reagent downwardly through a treating chamber and upwardly through an up-take chamber, drawing water from said up-take chamber and filtering the same, drawing water from said stream of water in said treating chamber before it reaches said up-take chamber and washing said filter therewith, and returning the filter wash water to said treating tank.

9. Water softening apparatus comprising a treating tank, a water heater delivering into said treating tank, means for supplying water and softening reagent in regulated quantities to said treating tank, a funnel-shaped up-take chamber in the lower end of said treating tank having its larger end open and directed toward the bottom of said treating tank, a filter, means for drawing water from said up-take chamber and passing it downwardly through said filter, a filter by-pass communicating with said last named means, means for drawing water from said treating tank at a point below the working water level in said treating tank and above said open end of said up-take chamber and passing it upwardly through said filter, and conduits for conveying said wash water back to said treating tank and to waste, respectively.

10. Water treating apparatus comprising a treating tank, an up-take chamber communicating with the lower end of said treating tank, means for supplying water and softening reagent to the top of said treating tank, a filter, a conduit connecting said up-take chamber with said filter, a conduit for withdrawing water from said treating tank at a point between the working water level in said treating tank and the intake end of said uptake chamber for washing said filter, whereby the rate of flow of water into said up-take chamber is not increased and the quantity of water in said treating tank between the point at which said conduit withdraws water and the working water level in said treating tank is greater than that required to wash said filter, and means for returning wash water from said filter into the top of said treating tank.

11. Boiler feed water softening apparatus comprising a treating chamber, an up-take chamber within said treating chamber forming a part thereof, a filter, means for withdrawing water from said treating chamber and passing it through said filter, means for withdrawing water from said treating chamber and passing it in reverse direction through said filter, and means for returning water from said filter to the top of said treating chamber.

12. Water softening apparatus comprising a treating tank, a water heater on top of said treating tank, an up-take chamber within said treating tank, a filter, means for withdrawing water from said up-take chamber and passing it through said filter in one direction, means for withdrawing water from said treating tank and passing it through said filter in the reverse direction, and means for returning said last named water to said treating tank.

13. Water treating apparatus comprising a treating tank, means for supplying water and softening reagent into the top of said treating tank, an up-take chamber within said treating tank, a filter, a pipe for withdrawing water from said up-take chamber and passing it to said filter, a conduit communicating with said treating tank remote from the upper end thereof for supplying water to said filter, a conduit connecting said filter with the upper end of said treating tank, said conduits connecting with said treating tank on opposite sides thereof.

14. Water treating apparatus comprising a treating chamber, an up-take chamber within said treating chamber, said up-take chamber extending from adjacent the lower end of said treating chamber and terminating remote from the upper end of said treating chamber, a filter, a conduit connecting the upper end of said up-take chamber with the normal inlet side of said filter, and a second conduit connecting said treating chamber outside of said up-take chamber with the normal outlet side of said filter for reverse washing thereof.

In testimony whereof I have hereunto affixed my signature this 7th day of May, 1920.

JOSEPH D. YODER.